United States Patent
Venezia

(10) Patent No.: US 10,343,886 B2
(45) Date of Patent: Jul. 9, 2019

(54) MOBILE WINE TASTING SYSTEM

(71) Applicant: NAPA ON WHEELS, LLC, Boca Raton, FL (US)

(72) Inventor: Alberto J. Venezia, Boca Raton, FL (US)

(73) Assignee: NAPA ON WHEELS, LLC, Boca Raton, FL (US)

( * ) Notice: Subject to any disclaimer, the term of this patent is extended or adjusted under 35 U.S.C. 154(b) by 306 days.

(21) Appl. No.: 15/082,747

(22) Filed: Mar. 28, 2016

(65) Prior Publication Data

US 2016/0280529 A1 Sep. 29, 2016

Related U.S. Application Data

(60) Provisional application No. 62/138,922, filed on Mar. 26, 2015.

(51) Int. Cl.
| | | |
|---|---|---|
| *B60P 3/00* | (2006.01) | |
| *B67D 1/16* | (2006.01) | |
| *B67D 1/08* | (2006.01) | |
| *G08G 1/00* | (2006.01) | |
| *G06Q 30/06* | (2012.01) | |
| *G06Q 50/12* | (2012.01) | |
| *B67D 3/00* | (2006.01) | |
| *B67D 1/00* | (2006.01) | |
| *B60P 3/025* | (2006.01) | |
| *B65D 5/66* | (2006.01) | |

(52) U.S. Cl.
CPC ............ *B67D 1/0888* (2013.01); *B60P 3/025* (2013.01); *B67D 1/001* (2013.01); *B67D 1/0005* (2013.01); *B67D 1/0858* (2013.01); *B67D 3/0003* (2013.01); *B67D 3/0006* (2013.01); *B67D 3/0009* (2013.01); *B67D 3/0029* (2013.01); *B67D 3/0041* (2013.01); *G06Q 30/0635* (2013.01); *G06Q 50/12* (2013.01); *G08G 1/202* (2013.01); *B67D 1/0891* (2013.01); *B67D 2001/0811* (2013.01); *B67D 2210/00089* (2013.01); *B67D 2210/00136* (2013.01)

(58) Field of Classification Search
CPC ........ B60P 3/0257; G07F 9/023; G06Q 30/00
See application file for complete search history.

(56) References Cited

U.S. PATENT DOCUMENTS

| | | | | |
|---|---|---|---|---|
| 4,597,422 A | * | 7/1986 | Kovacevich, Jr. ....... | B67D 1/04 141/85 |
| 4,632,350 A | * | 12/1986 | Brown .................... | E03D 9/038 248/295.11 |
| 4,821,921 A | * | 4/1989 | Cartwright ........... | B67D 1/1234 141/245 |
| 4,913,318 A | * | 4/1990 | Forrester .................. | B67D 1/02 222/129 |

(Continued)

*Primary Examiner* — Talia F Crawley
(74) *Attorney, Agent, or Firm* — Fishman Stewart PLLC

(57) ABSTRACT

An exemplary mobile wine tasting system may include a vehicle, e.g., a van or other automobile capable of transporting and serving at least one wine product, and at least one wine dispenser installed on the vehicle. The wine dispenser may be configured to dispense the at least one kind of wine to at least one of an interior compartment of the vehicle and an exterior of the vehicle. Accordingly, wine tasting experiences may be brought directly to customers, as opposed to requiring individuals to travel to a winery, bar, or tasting room.

19 Claims, 4 Drawing Sheets

(56) References Cited

U.S. PATENT DOCUMENTS

| | | | | |
|---|---|---|---|---|
| 5,086,818 A * | 2/1992 | Bendt | B67D 3/0025 | 141/351 |
| 5,913,454 A * | 6/1999 | McHale | B67D 1/0041 | 222/113 |
| 6,715,514 B2 * | 4/2004 | Parker, III | G06Q 10/08 | 141/1 |
| 8,091,378 B1 * | 1/2012 | Farias, III | B60R 9/065 | 222/399 |
| 8,152,023 B2 * | 4/2012 | Hatuka | A47J 31/005 | 221/96 |
| 2004/0045623 A1 * | 3/2004 | Parker, III | G06Q 10/08 | 141/1 |
| 2004/0222235 A1 * | 11/2004 | Hayduk | B29B 7/7663 | 222/1 |
| 2007/0233567 A1 * | 10/2007 | Daly | G06Q 30/0273 | 705/14.69 |
| 2008/0054015 A1 * | 3/2008 | Moezidis | B67D 1/0004 | 222/1 |
| 2009/0078724 A1 * | 3/2009 | Lamb | B60P 3/0257 | 222/608 |
| 2009/0218365 A1 * | 9/2009 | Taradalsky | B67D 1/04 | 222/1 |
| 2011/0253746 A1 * | 10/2011 | O'Keefe, Jr. | B67D 1/0005 | 222/132 |
| 2012/0199616 A1 * | 8/2012 | Lamb | B60P 3/0257 | 222/608 |
| 2013/0096715 A1 * | 4/2013 | Chung | G06Q 20/32 | 700/233 |
| 2013/0211928 A1 * | 8/2013 | De Benito Secades | G06Q 30/00 | 705/15 |
| 2013/0297066 A1 * | 11/2013 | Alvern | G07F 9/023 | 700/232 |
| 2014/0166694 A1 * | 6/2014 | Otto | B67D 1/0001 | 222/95 |
| 2014/0209634 A1 * | 7/2014 | Metropulos | B67D 1/0036 | 222/129.1 |
| 2014/0353998 A1 * | 12/2014 | White | B60P 3/0257 | 296/22 |
| 2015/0014481 A1 * | 1/2015 | Vandewall | B64D 11/0007 | 244/118.5 |
| 2015/0144652 A1 * | 5/2015 | Kline | B67D 1/0888 | 222/1 |
| 2016/0260155 A1 * | 9/2016 | Landsman | G06Q 30/0631 | |

* cited by examiner

MOBILE WINE TASTING SYSTEM

CROSS REFERENCE TO RELATED APPLICATIONS

This application claims priority to U.S. Provisional Patent Application No. 62/138,922, filed Mar. 26, 2015, the contents of which are hereby incorporated by reference in their entirety.

BACKGROUND

Wineries typically offer tastings for consumers in addition to commercial production of wine and related products. For example, wineries typically have tasting rooms which serve wine and associated snacks. Wineries use tastings as a mechanism to drive sales of their wines by allowing potential consumers to sample a variety of different wine types for much less cost than the price of purchasing bottles of each variety. However, tastings are necessarily limited to the tasting rooms in which they are served, requiring consumers to travel to winery tasting rooms or the like. Moreover, as production of wine and components thereof, e.g., grapes, is only possible in a narrow range of weather, wineries are generally located in one of a handful of geographical areas that have suitable weather.

Accordingly, there is a need for a more convenient mechanism for providing a wine tasting that does not require consumer travel.

BRIEF DESCRIPTION OF THE DRAWINGS

While the claims are not limited to the illustrated examples, an appreciation of various aspects is best gained through a discussion of various examples thereof. Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

Reference in the specification to "one embodiment," "an embodiment," "an example," or the like, means that a particular feature, structure, or characteristic described in connection with the embodiment is included in at least one exemplary illustration. The appearances of the phrase "in one example," etc. in various places in the specification are not necessarily all referring to the same exemplary illustration.

Various exemplary illustrations are provided herein of systems and methods for providing mobile wine tastings. In particular, the exemplary illustrations may generally allow wine tasting experiences to be brought directly to customers, as opposed to requiring individuals to travel to a winery, bar, or tasting room. An exemplary mobile wine tasting system may include a vehicle, e.g., a van or other automobile capable of transporting and serving at least one wine product, and at least one wine dispenser installed on the vehicle. The wine dispenser may be configured to dispense the at least one kind of wine to at least one of an interior compartment of the vehicle and an exterior of the vehicle. An exemplary process may include first receiving an order including information of at least one kind of wine to be served, a location at which the at least one kind of wine is to be served, and a quantity of the at least one kind of wine. The exemplary process may then include moving a vehicle to the location, and then dispensing, by at least one wine dispenser installed on the vehicle, at least a portion of the quantity to at least one of an interior compartment of the vehicle and an exterior of the vehicle.

Figure 1:
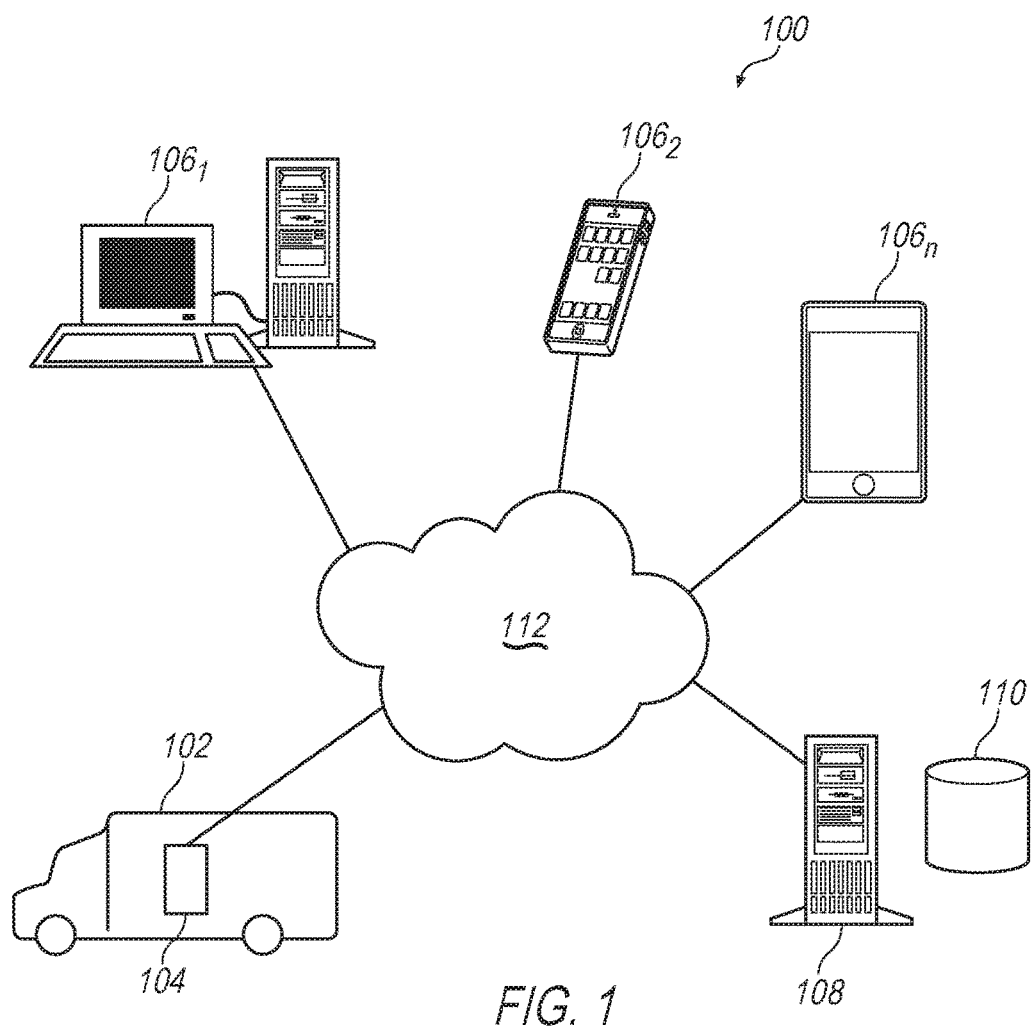
FIG. 1 is a system diagram of an exemplary mobile wine tasting system.
Figure 2:
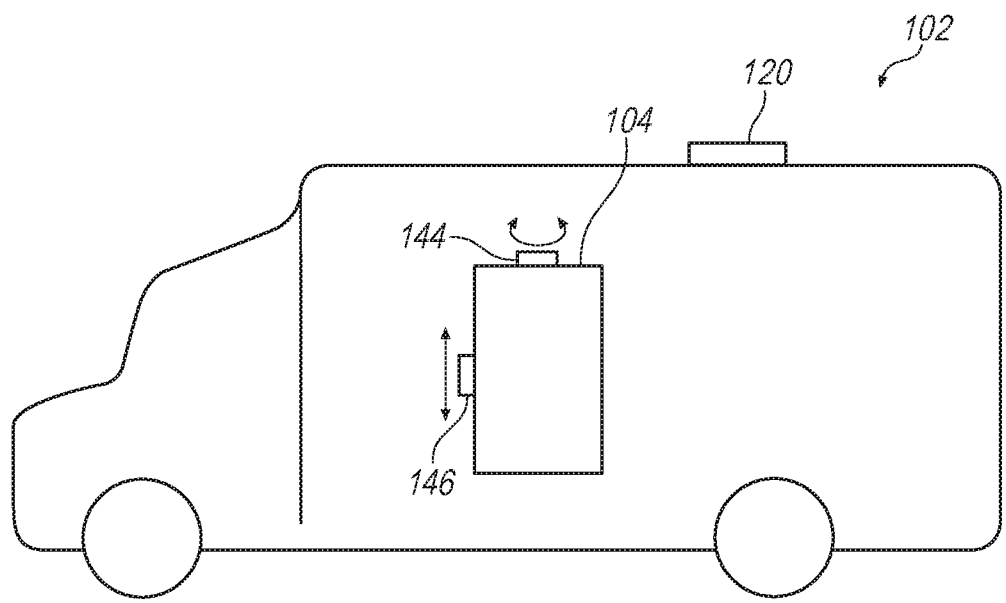
FIG. 2 is a schematic illustration of an exemplary vehicle of the mobile wine tasting system of FIG. 1.
Figure 3:
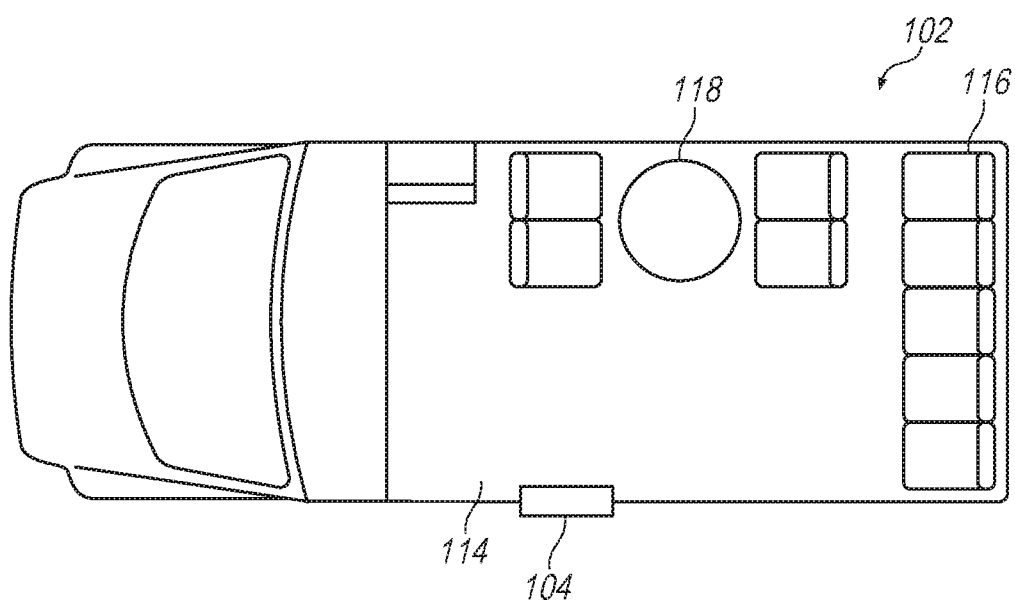
FIG. 3 is a schematic illustration of an interior compartment of the vehicle of FIG. 2.
Figure 4:
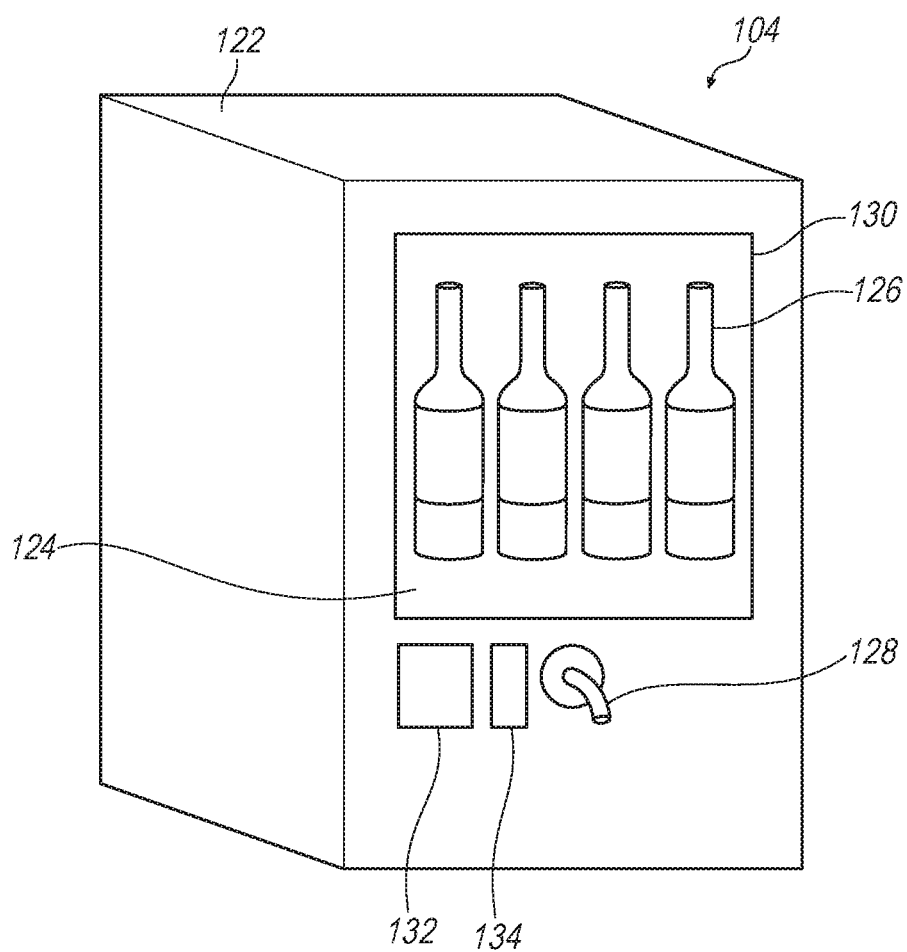
FIG. 4 is a schematic illustration of an exemplary wine dispenser of the mobile wine tasting system of FIG. 1.

Turning now to the figures, FIG. 1 illustrates an exemplary system 100 for providing mobile wine tasting. System 100 may include a vehicle 102, as illustrated in FIGS. 2 and 3 and described in more detail hereinafter, which is configured to travel to user locations to serve wine and/or associated products. Merely by way of example, a van, limousine, bus, or any other vehicle configured to travel on roads may be employed. The vehicle 102 may include a wine dispenser 104, as illustrated in FIG. 4 and described in more detail hereinafter, configured to dispense wine. System 100 may also include a user device $106_{1...n}$ by which a user may perform various functions, including, but not limited to, placing orders for wine and/or associated products, providing wine tasting preferences (e.g., preferred finish, flavor, color, brand, etc.), which may be stored along with a user account associated with the user, and the like. Examples of user devices may include, without limitation, a computer workstation, a server, a desktop, a notebook, a laptop, a handheld computer, a smartphone, a tablet, or some other computing system and/or device. System 100 may further include a server 108 and a data store 110. The server 108 may be configured to receive the information from the user devices $106_{1...n}$, store the information on the data store 110, and retrieve the information from the data store 110. The user devices $106_{1...n}$, the server 108, the vehicle 102, and/or the wine dispenser 104 may be in communication with each other over a communications network 112. The communications network 112 may include, but is not limited to, any combination of Ethernet, Bluetooth, Wi-Fi, Wi-Fi protocols (802.11b, 802.11g, 802.11n, etc.), 3G, 4G, or any other wired or wireless communications mechanisms. The server 108 may be connected to one or more data stores 110 physically (i.e., via a wired connection) and/or wirelessly over the communications network 112, for example, where the data store 110 is part of a cloud-based database.

Referring now to FIGS. 2 and 3, the wine dispenser 104 may be installed in a side wall of the vehicle 102. While the figures only illustrate the vehicle 102 as having one wine dispenser 104, it should be appreciated that the vehicle 102 may have any number of wine dispensers 104 installed on either side of the vehicle 102, the rear of the vehicle 102, or an interior wall of the vehicle 102 (not shown), for example, that divides the driver seat from an interior compartment 114. The interior compartment 114 may include any arrangement of seats 116, tables 118, and the like to provide a lounge-like setting for users/customers to have a wine-tasting experience similarly had at a winery, wine bar, or the like. Part of such experience may further include the ability to enjoy other products typically sold with or purchased by wine drinkers, e.g., tobacco products such as cigars. As such, the vehicle 102 may include systems to support such additional products, such as a ventilation system 120, which may permit smoking within the vehicle. Ventilation system 120 may include, but is not limited to, an exhaust fan and/or any configuration of ductwork to exhaust any smoke and/or odors from the interior compartment 114 to the exterior of the vehicle 102. Accordingly, customers may enjoy tobacco products such as cigars in the vehicle 102 without disturbing other customers or passengers in the vehicle 102. Moreover, provision of climate/ventilation controls in the vehicle 102 may allow consumption of cigars or other tobacco products in areas where ordinances restrict or prohibit their use. In this manner, even if cigar smoking is not permitted in an area, e.g., a public park, customers may smoke cigars within the vehicle without disturbing other customers/passengers or other people in the park. As a further part of the wine tasting experience, the vehicle 102 may also have space or storage to facilitate serving of associated food products or snacks. Merely as examples, space may be available within the vehicle 102 for serving platters of cheese, crackers, fruit, or other food. Typically, as part of the tasting, a host may also present information about the wine, food, or other products.

The wine dispenser 104 may be accessible from the interior compartment 114 and/or from the exterior of the vehicle 102. For example, the wine dispenser 104 accessible from the interior compartment 114 may be convenient for more intimate events and wine education sessions with smaller groups of people that can fit inside the interior compartment 114. Alternatively, or in addition, access to the wine device 104 may be capable from outside the vehicle 102, in which case the vehicle 102 may better service larger events or settings where it is inconvenient to serve customers within the vehicle 102. To switch between accessibility from the interior compartment 114 to the exterior of the vehicle 102 (or vice versa), the wine dispenser 104 may be configured to pivot or rotate in the wall of the vehicle 102 in which it is installed. Further, because the interior compartment 114 has a higher elevation than the ground of the exterior of the vehicle 102, when the wine dispenser 104 is rotated to be facing the exterior of the vehicle 102, a dispensing height may be too high or uncomfortably high for a user. As such, the wine dispenser 104 may further be configured to adjust its height up and down to be at a more reachable level for users. To enable the rotation and height adjustment, the vehicle 102 and/or the wine dispenser 104 may include rotation adjuster 144 and height adjuster 146. The rotation adjuster 144 may be any device(s) that may enable rotation, including, but not limited to, motors, shafts, gears, or any combination thereof. Similarly, the height adjuster 146 may be any device(s) that may enable an elevation change, including, but not limited to motors, servo motors, gears, chains, tracks, or any combination thereof. While shown as separate mechanisms, rotation adjuster 144 and height adjuster 146 may be combined in a single mechanism.

Referring now to FIG. 4, the wine dispenser 104 generally may include a housing 122 defining an interior cavity 124 in which wine bottles 126 may be stored. While FIG. 4 illustrates four wine bottles 126, it should be appreciated that the wine dispenser 104 may contain any number of wine bottles 126. Wine may be dispensed from the wine bottles 126 via a spigot 128 or other aperture through which the wine may flow from the interior cavity 124 to without. Alternatively, the wine bottles 126 may be just for display, and the wine may be dispensed from pouches, cartons, or other containers within the interior cavity 124 in which the wine is stored. While a common spigot 128 for all of the different kinds of wine is shown, it should be appreciated that each kind of wine may include its own spigot 126 to prevent any potential mixing of the different wines. The wine dispenser 104 may include a transparent panel 130 such that the wine bottles 126 may be viewable by users.

Figure 5:
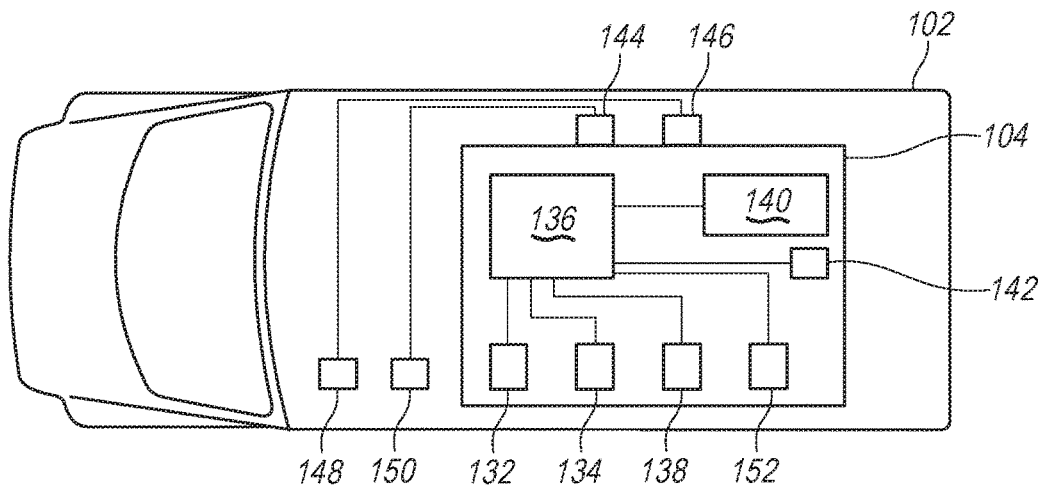
FIG. 5 is a block diagram of the vehicle and wine dispenser of FIGS. 2 and 4.

Because the wine is stored within the interior cavity 124 and the dispensing of the wine may spread across an extended period of time, the wine dispenser 104 may be configured to maintain a desired temperature or temperature range at which specific kinds of wines are typically maintained. To achieve this, the wine dispenser 104 may include a refrigeration system 140, as schematically illustrated in FIG. 5. The refrigeration system 140 generally may include any components that enable refrigeration and cooling, including, but not limited to, a compressor, evaporator and condenser coils, expansion valve(s), and the like. The wine dispenser 104 may also include a temperature sensor 142, also schematically illustrated in FIG. 5, to ensure that the desired temperature is being maintained.

The wine dispenser 104 may also include a user interface 132 by which a user may input such information, including, but not limited to, a desired wine to be dispensed, a quantity of the wine to be dispensed, authorization codes that indicate that the user is authorized to have wine served to him (e.g., is of legal age, placed the order, etc.), activation codes to pull up the specific order that was placed, and the like, and to place additional orders. The wine dispenser 106 may further include a card reader 134, which may serve various purposes, some similar to the user interface 132. For example, the user and/or guests of the user may be provided with authorization or activation cards that they may scan. The cards may include such information as the order information (e.g., wines and quantities that have already been paid for), specific wine to be dispensed and/or the quantity to be dispensed in smaller wine tasting sample sizes, and the like. In this manner, the user may maintain control over the particular services accessed by the user's guests. Alternatively or in addition, the card reader 134 may be configured to read forms of payment, including, but not limited to, credit cards, gift cards, bar codes, cellular phones, and the like. The card reader 134 may employ any technology to achieve these functions, including, but not limited to, a magnetic swiper, a chip reader, a bar code scanner, NFC, Bluetooth, and the like.

Referring now to FIG. 5, control diagram of the vehicle 102 and the wine dispenser 104 is shown. The wine dispenser 104 generally may include a controller 136 in communication with the user interface 132 and the card reader 134. The wine dispenser 104 may also include a valve 138 connected to the spigot 128 that controls the amount of wine being dispensed. For example, when the controller 136 receives specific information from the user interface 132 and/or the card reader 134, the controller 136 may command the valve 138 to open a certain amount and/or for a certain length of time to dispense a quantity of wine authorized by the received information. Alternatively, the controller 136 may be configured to command the valve 138 to open for a set amount of time such that a standardized quantity of wine is dispensed each time.

The controller 136 may also be in communication with the refrigeration system 140 and the temperature sensor 142 to control the temperature within the interior cavity 124. The controller 136 may have the desired temperature or temperature range pre-programmed in it. Alternatively or in addition, the temperature may be adjustable, for example, through the user interface 132. While FIG. 5 illustrates the wine dispenser 104 as having a single controller 136, it should be appreciated that the wine dispenser 104 may have multiple controllers 136 to perform different functions, e.g., wine dispensing and temperature control. The controller 136 may also be in communication with a transceiver 152 such that the controller 136 may interact with the user devices $106_1...n$ and/or the server 106, for example, to receive order and account information.

The vehicle 102 may include buttons or switches 148 and 150 to control the rotation adjuster 144 and the height adjuster 146, respectively. While two separate switches 148 and 150 are shown, it should be appreciated that there may be a single switch to control both movement functions. Also, each switch 148, 150 may include two separate switches or buttons to control opposite movements (e.g., up/down, clockwise/counterclockwise). The switches 148, 150 may be located in the interior compartment 114 of the vehicle 102 and/or on the outside of the vehicle 102. Alternatively or in addition, the switches 148, 150 may be incorporated in the wine dispenser 104, for example, in the user interface 132. In such a scenario, the controller 136 may further be in communication with the rotation adjuster 144 and the height adjuster 146 to control the respective movements based on commands received from the user interface 132.

In general, computing systems and/or devices, such as the user devices $106_1...n$, the server 108, and the controller 136, may include at least one memory and at least one processor. Moreover, they may employ any of a number of computer operating systems, including, but not limited to, versions and/or varieties of the Microsoft Windows® operating system, the Unix operating system (e.g., the Solaris® operating system distributed by Oracle Corporation of Redwood Shores, Calif.), CentOS, the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a handheld computer, a smartphone, a tablet, or some other computing system and/or device.

Such computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, Tomcat, representational state transfer (REST), etc. In general, the processor (e.g., a microprocessor) receives instructions, e.g., from the memory, a computer-readable medium, etc., and executes these instructions, thereby performing one or more processes including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instruction) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including, but not limited to, coaxial cables, copper wire, and fiber optics, including the wires that comprise a system bus coupled to a processor of a computer. Common forms of computer-readable media include, for example, a floppy disk, a flexible disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as data store 110, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Alternatively, the application software product may be provided as hardware or firmware, or combinations of software, hardware, and/or firmware.

Figure 6:
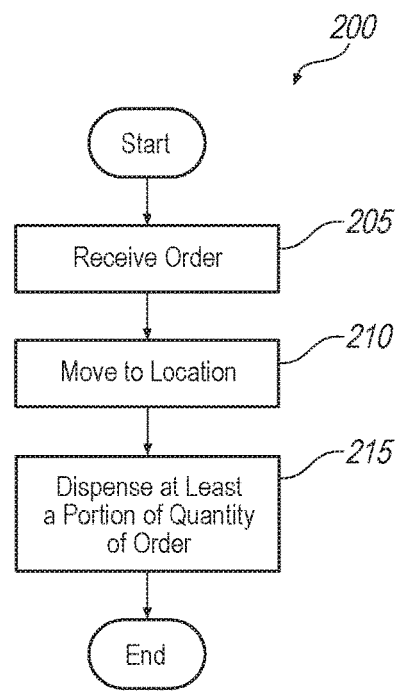
FIG. 6 is flow diagram of an exemplary process for providing mobile wine tasting.

Referring now to FIG. 6, an exemplary process 200 for providing a mobile wine tasting is illustrated. While process 200 is described with respect to system 100, it should be appreciated that process 200 may be applied using any system having components that may perform the steps of process 200. Process 200 may begin at block 205, where an order for wine and/or wine accessories may be received from a user. The user may have to sign into a user account associated with the user, in which user information and preferences, such as user's age and payment preferences, may be stored. The order may be placed via a user device $106_1...n$, and may be received by the server 108 and stored in the data store 110. The order may include a quantity of each kind of wine and/or accessories ordered, for example, total ounces for each wine, and a location at which the wine and/or wine accessories are to be provided for tasting, such as at a social event or gathering. At block 210, the ordered wine and/or wine accessories may be moved by vehicle 102 to the location in the order. At block 215, the wine may be dispensed to the user and/or guests of the user by the wine dispenser 104. Before block 215, process 200 may also include first receiving activation and/or authorization information, for example, via the user interface 132 and/or the card reader 134. The wine dispenser 104 may then retrieve order and/or account information from the server 108. Thus, the wine dispenser 104 may know which kind of wine to dispense and in what quantity. Block 215 may be repeated until the quantity from the specific order is used up, after which process 200 may be repeated, or until the event has expired. Before, after, or between repeats of block 215, process 200 may also include receiving a command to adjust a position (e.g., rotational position and/or height) of the wine dispenser 104, for example, by switches 148, 150 and/or the user interface 132, and then adjusting the position accordingly. Process 200 may terminate after block 215.

In addition to the wine dispensing, information may be communicated to customers regarding wine product(s) and/or the winemaking process. Merely as examples, a host may provide information regarding different varieties of wine, different grape varietals, the process of making wine, and any other information a winery may see fit to provide to potential customers. Further one or more food products may be served to the potential customers. For example, cheese, crackers, fruit, or other food may be provided along with any wine that is being served.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a vehicle configured to travel to a location at which wine is to be served;
   a wine dispenser installed on the vehicle, the wine dispenser configured to dispense the wine to an interior compartment of the vehicle and to an exterior of the vehicle;
   a rotation adjuster to adjust a rotational position of the wine dispenser; and
   a height adjuster to adjust an elevational height of the wine dispenser;
   wherein the rotation adjuster adjusts the rotational position of the wine dispenser to provide accessibility to the wine dispenser from the interior compartment and from the exterior of the vehicle; and
   wherein the height adjuster adjusts the elevational height of the wine dispenser, when the wine dispenser is accessible from the exterior of the vehicle, from a first elevation to a second elevation that is lower than the first elevation.

2. The system of claim 1, wherein the wine dispenser is configured to automatically dispense a portion of a quantity of an order for the wine.

3. The system of claim 2, wherein the wine dispenser includes a card reader configured to read a card to obtain information that includes the portion of the quantity of the order for the wine to be dispensed.

4. The system of claim 1, further comprising a user device and a server in communication with the user device to receive an order, the order including information of at least one kind of wine to be served, the location at which the one kind of wine is to be served, and a quantity of the one kind of wine to be served.

5. A vehicle comprising at least one wine dispenser installed on at least one wall of the vehicle, the wine dispenser configured to dispense the at least one kind of wine to at least one of an interior compartment of the vehicle and to an exterior of the vehicle depending on a rotational position of the wine dispenser, the vehicle further comprising a rotation adjuster to adjust a rotational position of the wine dispenser, and a height adjuster to adjust an elevational height of the wine dispenser;
   wherein the rotation adjuster adjusts the rotational position of the wine dispenser to provide accessibility to the wine dispenser from the interior compartment and from the exterior of the vehicle; and
   wherein the height adjuster adjusts the elevational height of the wine dispenser, when the wine dispenser is accessible from the exterior of the vehicle, from a first elevation to a second elevation that is lower than the first elevation.

6. The vehicle of claim 5, wherein the wine dispenser is configured to automatically dispense at least a portion of a quantity of an order for the at least one wine, and the wine dispenser includes a card reader configured to read a card to obtain information that includes at least the at least a portion of the quantity of the order for the at least one wine to be dispensed.

7. The vehicle of claim 5, further comprising a ventilation system configured to exhaust smoke from the interior compartment of the vehicle.

8. A method comprising:
   positioning a wine dispenser within a vehicle, the vehicle having a rotation adjuster to adjust a rotational position of the wine dispenser, and a height adjuster to adjust an elevational height of the wine dispenser;
   receiving an order including information of at least one kind of wine to be served, a location at which the at least one kind of wine is to be served, and a quantity of the at least one kind of wine;

moving the vehicle to the location;
rotating the wine dispenser, via the rotation adjuster, to face toward an interior of the vehicle or toward an exterior of the vehicle, based on the order;
adjusting a height of the wine dispenser based on whether the wine dispenser is faced toward the interior of the vehicle or toward the exterior of the vehicle; and
dispensing, by at least one wine dispenser installed on the vehicle, at least a portion of the quantity to at least one of an interior compartment of the vehicle and an exterior of the vehicle;
wherein rotating the wine dispenser further comprises rotating a rotational position of the wine dispenser to provide accessibility to the wine dispenser from the interior compartment and from the exterior of the vehicle; and
wherein adjusting the height of the wine dispenser further comprises adjusting an elevational height of the wine dispenser, when the wine dispenser is accessible from the exterior of the vehicle, from a first elevation to a second elevation that is lower than the first elevation.

9. The system of claim 1, further comprising a controller in communication with the rotation adjuster and the height adjuster to control movements thereof, based on commands received from a user interface.

10. The system of claim 1, further comprising a common spigot attached to the wine dispenser such that different types of wine may be selectively dispensed from different bottles through the common spigot.

11. The vehicle of claim 5, further comprising a controller in communication with the rotation adjuster and the height adjuster to control movements thereof, based on commands received from a user interface.

12. The vehicle of claim 5, further comprising a common spigot attached to the wine dispenser such that different types of wine may be selectively dispensed from different bottles through the common spigot.

13. The method of claim 8, further comprising providing a controller that is in communication with the rotation adjuster and the height adjuster to control movements thereof, based on commands received from a user interface.

14. The method of claim 8, further comprising attaching a common spigot to the wine dispenser such that different types of wine may be selectively dispensed from different bottles through the common spigot.

15. The system of claim 1, wherein the rotation adjuster is a separate mechanism from the height adjuster; and
wherein the rotation adjuster comprises a motor and a shaft, the motor and the shaft configured to rotate the wine dispenser.

16. The system of claim 1 further comprising a server in communication with the wine dispenser over a communications network.

17. The system of claim 16, wherein:
the server is configured to:
receive a drink order from a user device; and
transmit the drink order to the wine dispenser; and
the wine dispenser is configured to dispense the wine according to the drink order.

18. The vehicle of claim 5 further comprising a server in communication with the wine dispenser over a communications network.

19. The vehicle of claim 18, wherein:
the server is configured to:
receive a drink order from a user device; and
transmit the drink order to the wine dispenser; and
the wine dispenser is configured to dispense the at least one kind of wine according to the drink order.

* * * * *